US008001614B2

(12) United States Patent  
Eisen

(10) Patent No.: US 8,001,614 B2  
(45) Date of Patent: Aug. 16, 2011

(54) SYSTEM AND METHOD FOR MAKING ENCRYPTED CONTENT AVAILABLE TO DERIVABLE RELATED PARTIES

(75) Inventor: Jeffrey N Eisen, Waban, MA (US)

(73) Assignee: International Business Machines Corporation, Armonk, NY (US)

( * ) Notice: Subject to any disclaimer, the term of this patent is extended or adjusted under 35 U.S.C. 154(b) by 1033 days.

(21) Appl. No.: 11/566,342

(22) Filed: Dec. 4, 2006

(65) Prior Publication Data

US 2008/0133911 A1 Jun. 5, 2008

(51) Int. Cl.  
*G06F 7/04* (2006.01)

(52) U.S. Cl. .......... 726/28; 726/2; 726/22; 726/26; 705/57

(58) Field of Classification Search .......... 726/2, 28, 726/26; 705/57  
See application file for complete search history.

(56) References Cited

U.S. PATENT DOCUMENTS

| | | | |
|---|---|---|---|
| 4,351,982 A | 9/1982 | Miller et al. | |
| 6,002,769 A | 12/1999 | McGough | |
| 6,289,105 B1 | 9/2001 | Murota | |
| 6,393,127 B2 | 5/2002 | Vogler | |
| 6,636,965 B1 | 10/2003 | Beyda et al. | |
| 6,643,684 B1 | 11/2003 | Malkin et al. | |
| 6,782,475 B1 | 8/2004 | Summer | |
| 6,970,566 B1 | 11/2005 | Kimura | |
| 7,082,538 B2 | 7/2006 | Bouchard et al. | |
| 7,085,376 B2 | 8/2006 | DiSanto et al. | |
| 2001/0044828 A1* | 11/2001 | Kikinis | 709/206 |
| 2005/0268101 A1* | 12/2005 | Gasparini et al. | 713/176 |
| 2007/0177731 A1* | 8/2007 | Spies et al. | 380/47 |
| 2008/0133911 A1* | 6/2008 | Eisen | 713/168 |

* cited by examiner

*Primary Examiner* — Jason K Gee  
(74) *Attorney, Agent, or Firm* — Ayla A. Lari; Hoffman Warnick LLC

(57) ABSTRACT

A new system and method have been invented to allow a sender/author/user who wishes to send e-mail or a calendar meeting document to someone and make it available to her or his assistant or manager without the need of the sender/author/user finding out who the assistant or manager is. That is, the system and method of the present invention allows the sender/author/user to choose a select number of recipients or even the role who are able to decrypt the email/attached document. Further, the new system and method provides a sender/author/user to choose which level of authority each user or user role.

22 Claims, 10 Drawing Sheets

**Figure 3
(Prior Art)**

SYSTEM AND METHOD FOR MAKING ENCRYPTED CONTENT AVAILABLE TO DERIVABLE RELATED PARTIES

FIELD OF THE INVENTION

The invention relates generally to encrypting data, and, more particularly, to a system and method for encrypting data so that named recipients, as well as certain derivable unnamed recipients, may have the ability to receive and decrypt the encrypted content.

BACKGROUND OF THE INVENTION

Encryption, or the process of converting ordinary information ("plaintext") into something unintelligible ("ciphertext"), has been used for centuries to allow a user/sender/author to convey sensitive or confidential information to other parties so that such information, if intercepted by another who is not intended to receive or to read the information, is unintelligible to the unintended recipient. The encrypted information, data or content, once received by the intended parties, must be decrypted in order for the intended parties to understand the information. Decryption is the reverse from encryption and is the process of moving the encrypted information from the unintelligible ciphertext back to plaintext.

Cryptography has been important over the years but maybe never more critical than in this modern era of electronic communication. For example, in the present day, people work and operate in an environment of sending and receiving much information—in the form of, e.g., emails, text messages, instant messages, blogs or other web communications. It is not unusual for a worker to rarely pick up a pen or pencil as much work is done online. Further, the speeds and bandwidths available today allow for many electronic files to be easily sent or transferred from a sender to one or more intended recipients. This has made industry much more efficient.

However, there is an increased risk that an electronic file will be intercepted by an unintended recipient. Due to the proliferation of wireless communications, this risk has increased in recent years.

The inadvertent disclosure of data can pose a serious issue such as by exposing a company's trade secrets or other confidential information to a party who may use it to the company's disadvantage. As such, many times, a sender will choose to encrypt the content prior to sending.

Encryption forms and levels vary in forms of complexity as well as ease of use. For instance, an electronic file (e.g., such as a word processing document) may be encrypted by the author utilizing the application's (e.g., work processing application) encryption mechanism. By way of example, in a most basic form, an author may password protect an electronic file (the password being used as the cipher to the encrypted file, the application having an encryption algorithm to transform the plaintext into ciphertext), send the encrypted file, and convey the password to the recipients by way of a separate manner—such as by telephone or a separate email. The recipients then, when opening the file and being challenged for the password may use the password to open the encrypted file. This is well-known as are other forms of cryptography such as symmetric key cryptography and public key (Diffie-Hellman or asymmetric key) cryptography.

There are many levels of encryption. For instance, a database can be encrypted, a file or document can be encrypted as noted above, or a field can be encrypted.

The most popular level of information to encrypt is e-mail as it is most prolific form of electronic communication. For many people, e-mail is often a substitute for a real conversation. Therefore, similar to the real world where one can shut the door and have a private conversation, e-mail correspondence needs the same capability. To accommodate this need, many email clients provide the ability to encrypt mail before a user sends it, after the user receives it, or before the user saves it. One example of a very popular and highly successful email client is IBM's Lotus® Notes® client which works in conjunction with IBM's Lotus® Domino server software. A description of Lotus Notes and Lotus Domino can be found here:
http://www-142.ibm.com/sofrware.sw-lotus/products/
  product4.nsf/wdocs/
  noteshomepage?OpenDocument&ewesite=notes Email client software is installed on a client computer 520, seen in FIG. 5, and works in conjunction with server software installed on the server shown as numeral 540 in the FIG. 5. In the basic installation, the client computer 520 communicates with server 540 as well as other computers 534, 534A, 534B 534C.

An email client may use a form of the public key encryption noted above. For mail encryption, a user encrypts a mail message before he/she sends the message, Notes uses the recipient's public key to transform the plaintext of the message body to ciphertext. Once received, the recipient's private key decrypts the message. The private key is part of the user's ID file. Therefore, without the right ID file, the message body looks like gibberish. Of course, messages aren't safe if that ID file is lost or stolen; however, if the ID owner has applied a password (one that is difficult to guess, such as a string of random alpha-numeric characters) to his ID file, encrypted messages remain safe.

An example of the UI which allows a user to make such selections is shown in FIG. 1 where a user can encrypt mail before he sends it through a manual option, or automatically by selecting the encryption setting in his user preferences. To use the manual setting:
1. The user opens the message he wants to send in edit mode;
2. The user chooses Actions-Delivery Options (the pictorial shown as 100 in FIG. 1);
3. The user selects the Encrypt option 102; and
4. The user then clicks OK 104.

The message is encrypted using the encryption algorithm of the email client. This option applies to the current message; future messages are not encrypted unless this delivery option is selected. If, however, the user wishes all outgoing messages encrypted automatically, and the email client allows that option, the user makes the following user preference selection as shown in FIG. 2:
1. Choose File-Tools-User Preferences.
2. Select Mail in the User Preferences dialog box shown in the UI screen 200
3. Select Encrypt sent mail 202.
4. Click OK 204.

Once this option is set, the email client encrypts all outgoing messages. If the recipient's public key is not available, which is often the case for Internet mail, a warning message may appear. This message allows the user to continue sending this message or cancel it.

Incoming messages may also be encrypted. For instance, in Lotus Notes, this option is found in the user's Person document in the Public Address Book. To encrypt all incoming mail, a user performs the following steps (as shown in FIG. 3):
1. Open the Public Address Book.
2. Open the user's Person document 300

3. Click the Edit person button.
4. In the "Encrypt incoming mail" field 302, select Yes.

Enabling this option automatically encrypts all received mail with the user's public key. Decryption relies on the user's private key, which is part of the user ID file.

The previous description provides some background to the email encryption/decryption process in an email system. One of the problems of the present day encryption systems, however, is that only the listed recipients are able to decrypt the email message or calendar invitation. This is a problem as it is often the case that the author wants the data to be readable by additional parties. The most typical case of this is to allow an executive's administrative assistant or the recipient's manager to also read the encrypted data.

The state of the art is cumbersome. Presently, if a user wishes, for example, to send e-mail or a calendar meeting document to someone and make it available to his or her assistant or manager, the user needs to first identify who his or her assistant or manager is (typically by searching a user interface for a directory) and then enter the assistant's or manager's name as an e-mail recipient to allow them to read the mail. This is wasted effort to locate the name. It is also unnecessary for the assistant or manager to actually receive the e-mail in his or her own mailbox because the assistant or manager many times reads the mail directly out of the executive's mailbox.

An alternative approach is for the assistant or manager to use the principal's/executive's credentials, i.e, use his or her password. This behavior is prohibited by many organizations for numerous security reasons. For instance, it allows the assistant or manager to impersonate the principal in sending emails as well as in signing the communications. Additionally, it may allow the administrative assistant or manager to read documents he or she is not authorized to read. That is, it doesn't give the author/sender control allowing some messages to be read by the assistant or manager and others to be protected from the assistant or manager.

Another alternative approach, which allows the assistant to read incoming messages without allowing the assistant to send outgoing messages under the premise that it is from the principal, is for the assistant and the principal to share an encryption public/private key but not to share a signing public/private key. This is only available in some software systems (most systems combining the encryption and signing credentials into a single credential). This solves the impersonation problem but still does not solve the granularity problem. That is, it doesn't give the author/sender control allowing some messages to be read by the assistant, some messages to be edited and replied to by the assistant while others to be protected from the assistant.

In view of the foregoing, a need exists to overcome these problems by providing a system and method for an end user to encrypt an email or other data and send that communication to a recipient, and to choose specific people and/or roles who should be able to read the content in the email or communication.

SUMMARY OF THE INVENTION

The invention is to provide a system and method which allows an author to encrypt content and to allow the author to specify particular parties who shall have authorization to access the content. The system and method of the present invention shall further allow the author to specify related parties or particular roles which shall have the authorization to access the content.

The system and method of the present invention further allows the user to select the granularity of authorization for a particular recipient, related parties or particular roles. For instance, an author may choose to give the role of administrative assistant the authority of to read one email or other document but choose not to give the role the ability to read another.

In one embodiment of the present invention, the author/sender can elect to allow the related parties of explicit names/parties to read the encrypted data when encrypting content. Alternatively, the author/sender can elect to not allow the related parties of explicit names/parties to read the encrypted data when encrypting content.

In a second embodiment, the system and method allow the author to automatically allow parties who are related to the explicitly listed names in the "encrypted for" list when encrypting data by choosing the related parties. In the preferred embodiment, a checkbox in the UI when sending encrypted e-mail of whether to "Allow Reading by Recipient's Assistants" or alternatively to choose a role of a party who has some or all access rights.

In a third embodiment, the system and method allow the author to create a personal contact record so that the system and method will automatically allow encrypt for parties identified in the personal contact record and in the manner specified in the personal contact record. For example, the personal contact record may specify that "whenever I encrypt for Joe Smith, also automatically include a key for Mary Jones".

The system of the present invention comprises a UI interface for receiving the author's input choices as to the parties having various levels of authorization, a name parsing mechanism which identifies and verifies the names chosen by the author/sender, a role identification module for receiving the roles having some level of authorization which are associated with the identified recipients, a look up module to identify and verify the parties which are associated with the authorized recipients, and an authorization module to authorize the associated parties or roles to access the encrypted content.

In another embodiment, if the user indicates to include the additional parties, their names can be automatically obtained from canonical sources such as a LDAP lookup of the "assistant" field on the executive's/recipient's directory record. Their names can then be included in the "encrypted for" list resulting in the data being readable by the additional party, typically by including the assistant's public key when encrypting the data.

This approach allows an author to have control over who can read the content, easily allowing reading by assistants and other related parties which is a common use case.

There are multiple mechanisms for obtaining the data necessary to encrypt for the additional party. There are also multiple UI mechanisms that could be used to indicate to include additional parties.

For the UI, the indication could be a setting for the entire document (i.e., add the assistant for all the recipients) or it could be a setting chosen for each recipient. The setting could also be a sticky preference or set each time authoring.

For the retrieving the data, the additional name(s) would typically be done by a directory lookup by a central directory. These lookup could be for the "assistant" or it could be a specially created field in the directory indicating the "additional encrypted readers" for a user.

The information could also (either alternatively or in addition) come from local data, such as a personally created contact record where a user indicates "whenever I encrypt for Joe Smith also automatically include the key for Mary Jones".

Alternatively, one could also include in the executive's directory record the additional public key to use (assuming public key encryption) when encrypting data for the executive rather than actual additional person names. With this mechanism, multiple assistants who all have access to the private key for the additional public key could each decrypt the data. The advantage of this mechanism is that it is easier to encrypt for a group of people (such as assistants) where the actual membership changes over time.

Additionally, when sending an encrypted message that includes additional parties not in the recipient list (such as administrative assistants), the message could contain the names of the additional parties (either retrievable from the encrypted info/keys in some encryption schemes or explicitly added by means such as "X-header" extensions to the message) so that any "reply with history" could continue to be decryptable by the additional parties if the person creating the "reply with history" so desired.

In another embodiment, a document such as an Excel spreadsheet is encrypted on a single machine by listing the names of the people who can decrypt it and checking the "and their executive assistants" checkbox.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

Figure 3:
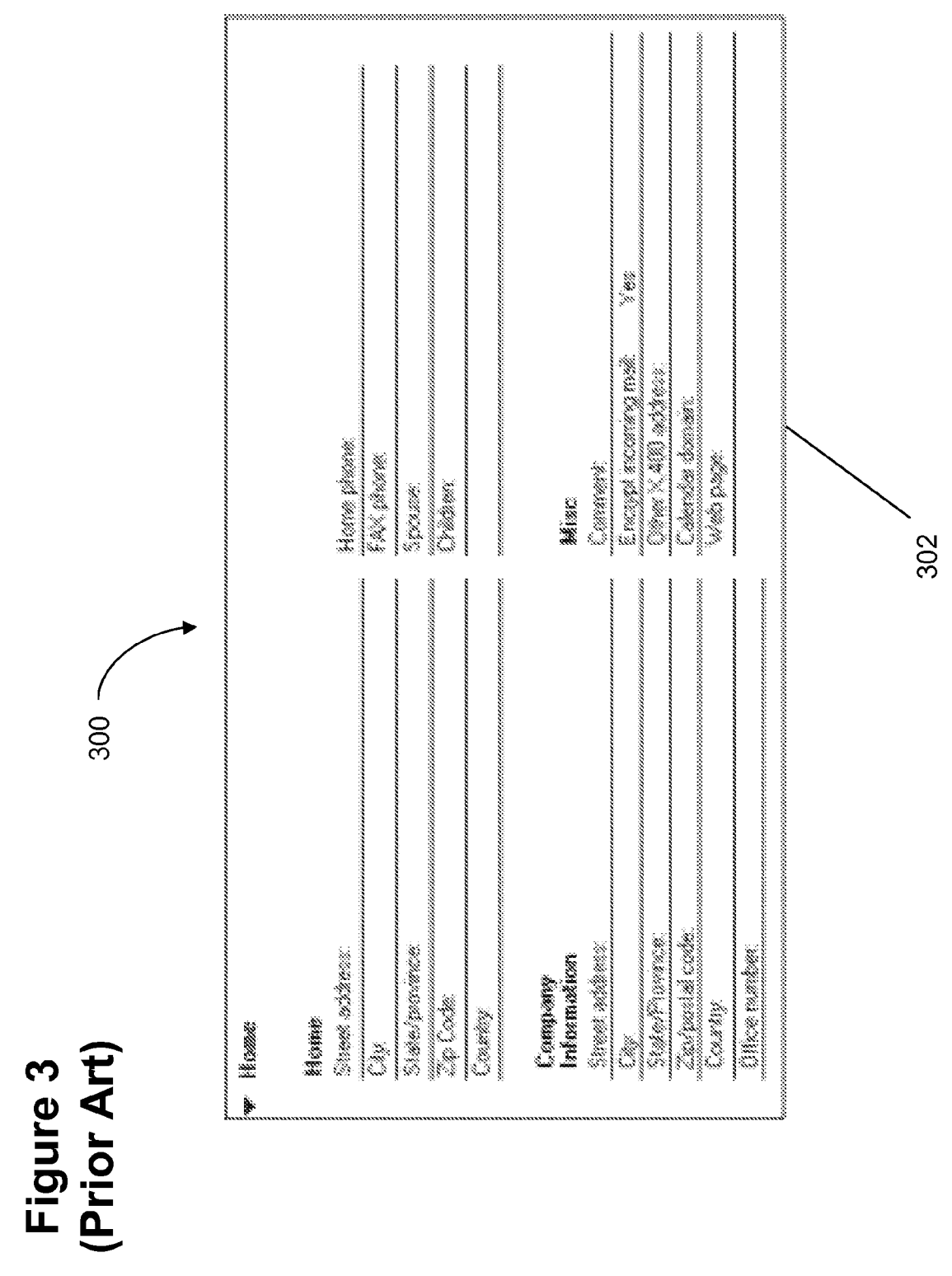

FIG. 3 is another pictorial diagram showing a prior art user interface challenge or pop-up for a user or author.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As used herein, unless otherwise noted, the term "set" means one or more (i.e., at least one) and the phrase "any solution" means any now known or later developed solution. Additionally, the term "data store" means any type of memory, storage device, storage system, and/or the like, which can temporarily or permanently store electronic data, and which can be included in a storage and/or memory hierarchy (collectively referred to herein as a "memory hierarchy") for a computer system.

Figure 5:
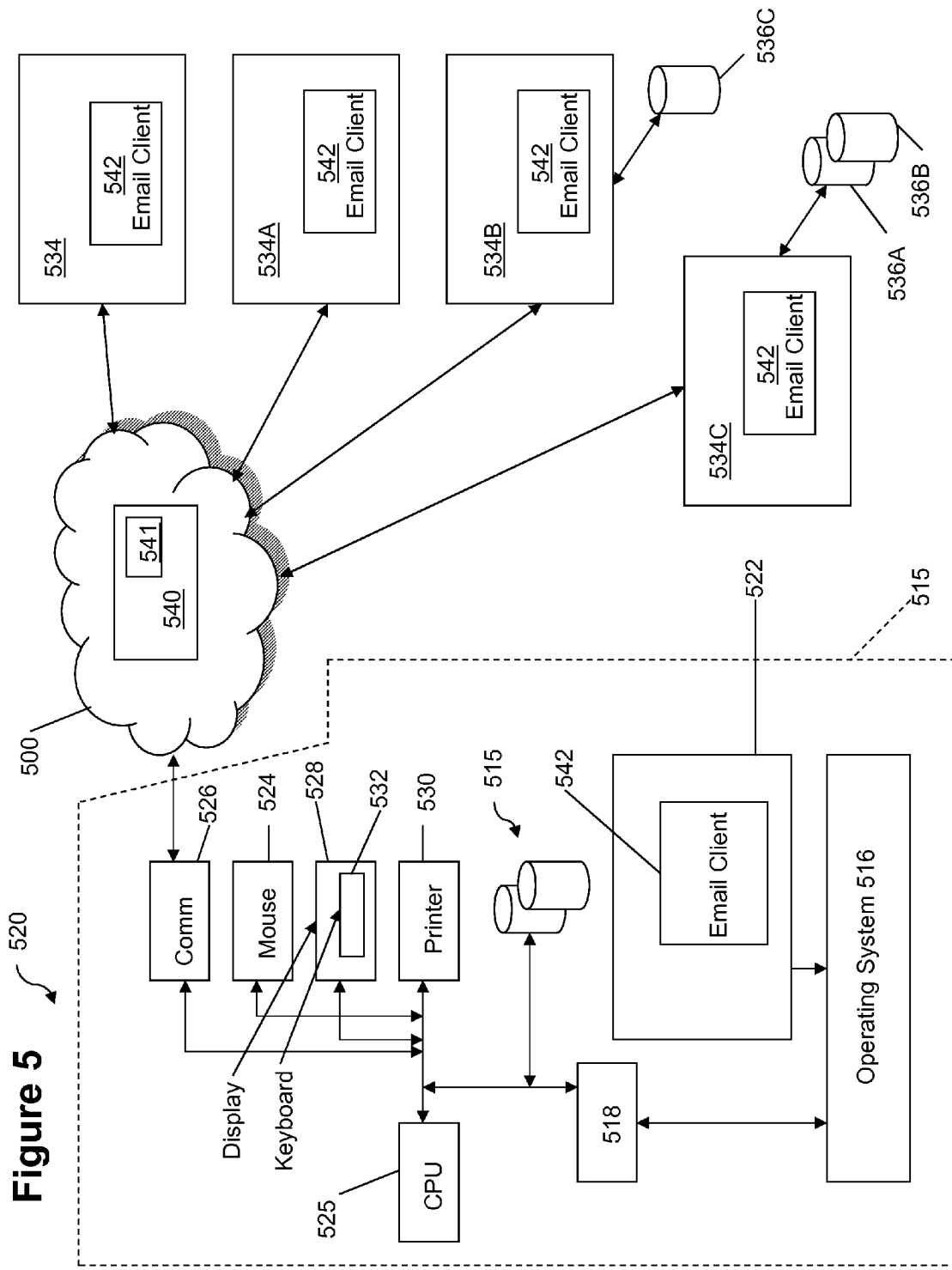
FIG. 5 is a pictorial diagram showing a computer system user which interacts with other computers through a network.

With reference to the accompanying drawings, a detailed description of the present invention will be provided. FIG. 5 is a block diagram showing the components of a general purpose computer system 520 connected to an electronic network 500, such as a computer network. The computer network 500 can also be a public network, such as the Internet or Metropolitan Area Network (MAN), or other private network, such as a corporate Local Area Network (LAN) or Wide Area Network (WAN), or a virtual private network (VPN). As shown in FIG. 5, the computer system 520 includes a central processing unit (CPU) 525 connected to a system memory 515. The system memory 515 typically contains an operating system 516, a BIOS (basic input/output system) driver 518, and application programs 522. Operating System (OS) 516 may be one of many operating systems such as those for personal computers as Linux, Microsoft Windows, Mac and Unix. (An OS is a software program that manages the hardware and software resources of a computer and performs basic tasks, such as controlling and allocating memory, prioritizing the processing of instructions, controlling input and output devices, facilitating networking, and managing files.) In addition, the computer system 520 contains input devices 524 such as a mouse and a keyboard 532, and output devices such as a printer 530 and a display monitor 528.

The computer system generally includes a communications interface 526, such as an Ethernet card, to communicate to the electronic network 500. Other computer systems 534, 534A, 534B and 534C may also be connected to the electronic network 500. One skilled in the art would recognize that the above system describes the typical components of a computer system connected to an electronic network. It should be appreciated that many other similar configurations are within the abilities of one skilled in the art and all of these configurations could be used with the methods of the present invention.

Furthermore, one skilled in the art would recognize that the other computer systems 534B and 534C could consist of a database server and/or an application software server connected to databases 536A/536B and 536C, respectively for performing tasks requested by computer 520 or other computers 534 and 534A. Further, other computers 534 and 534A, in this example, could be personal computers assigned to other personnel within the company or organization.

In addition, one skilled in the art would recognize that the "computer" implemented invention described further herein may include components that are not computers per se but include devices such as Internet appliances and Programmable Logic Controllers (PLCs) that may be used to provide one or more of the functionalities discussed herein. Also, computer or computer-like devices and communication devices may include PDAs or personal digital assistants (e.g., Blackberries) or cellular phones. Furthermore, "electronic" networks are generically used to refer to the communications network connecting the processing sites of the present invention, including implementation by using optical or other equivalent technologies.

One skilled in the art would recognize that other system configurations and data structures and electronic/data signals could be provided to implement the functionality of the present invention. All such configurations and data structures are considered to be within the scope of the present invention.

Within the network 500 of FIG. 5, represented by a cloud, in the preferred embodiment, the Lotus Domino server 540 resides and is connected to computer 520, and other computers 534, 534A, 534B, and 534C. It should be noted that one skilled in the art would recognize that the server 540, while residing in the network cloud 500 of the present example, could be connected to any computer directly, by way of one or more interconnected corporate network or one or more Internet network and it will still perform in the same manner. As noted above, in the preferred embodiment, the server 540 of the present invention is an IBM® Domino® Server. In addition, in the preferred embodiment, the computers (520, 534, 534A, 534B and 534C) each have an IBM® Lotus Notes® client application installed thereon so that the server 540 and the computers (520, 534, 534A, 534B and 534C) may communicate utilizing specified protocols and functions. For the purposes of this application, these will be called "Email clients" 542. More information may be obtained regarding IBM Lotus Domino and Notes software at www.ibm.com or, more specifically, at http://www-142.ibm.com/software/sw-lotus/products/product4.nsf/wdocs/noteshomepage?OpenDocument&ewesite=notes.

According to the present invention, user at computer 520 communicates with other computers 534, 534A, 534B and 534C via well known networking protocols and systems. And, it is well known that an email or other e-communication may be encrypted or decrypted. Generally, this is typically done by listing the recipients of the e-mail (To, CC, BCC) and marking the e-mail to be encrypted (with a mark in a checkbox or similar gesture). While it is sometimes the case that the author wants the encrypted data to be readable solely by the listed parties, it is often the case that the author wants the data to be readable by additional parties. The present state of the art is cumbersome as was discussed in the background of the invention. The present invention solves by providing an easy way to allow an author/sender to add additional encrypted readers (typically having a relationship with one of the recipients) and the invention provides other advantages.

Figure 6:
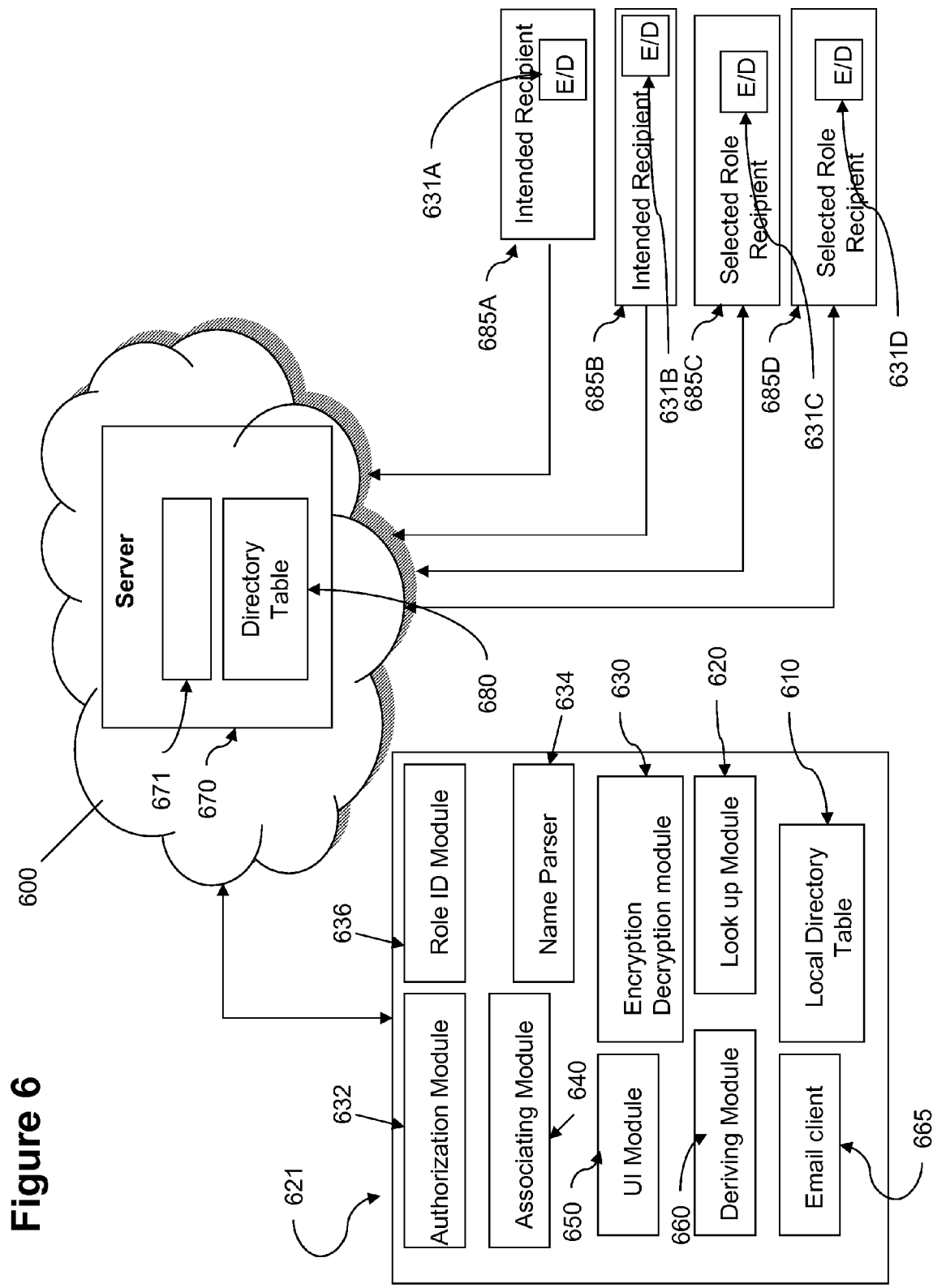
FIG. 6 is a pictorial diagram showing a network and the sender and the intended recipients and authorized roles.

Referring again to the figures, FIG. 6 illustrates a network having numerous clients 621, 685A, 685B, 685C, 685D. These clients are similar to the components to FIG. 5 and have the basic components of any computer system known today such as the OS, memory, applications, I/O components— among other functions. However, there are significant distinctions to be explained in great detail below.

In FIG. 6, computer 621 is connected to network cloud 600. Computer 621, as shown in the FIG. 6, comprises an associating module 640, a UI module 650, a deriving module 660, a look up module 620, an encryption module 630, an email client 665, a local directory table 610, a name parser 634, a role identification module 636, and an authorization module 632. Each and all of these modules can be in software form or hardware form in the computer system and are connected to one another.

The email client 665, sometimes also called a mail user agent (MUA), is a computer program that is used to read and send e-mail. There are many different types of email clients, such as IBM Lotus Notes, Mozilla Thunderbird, and Microsoft Office Outlook. Most email clients use the Simple Mail Transport Protocol (SMTP) to send emails.

Figure 7:
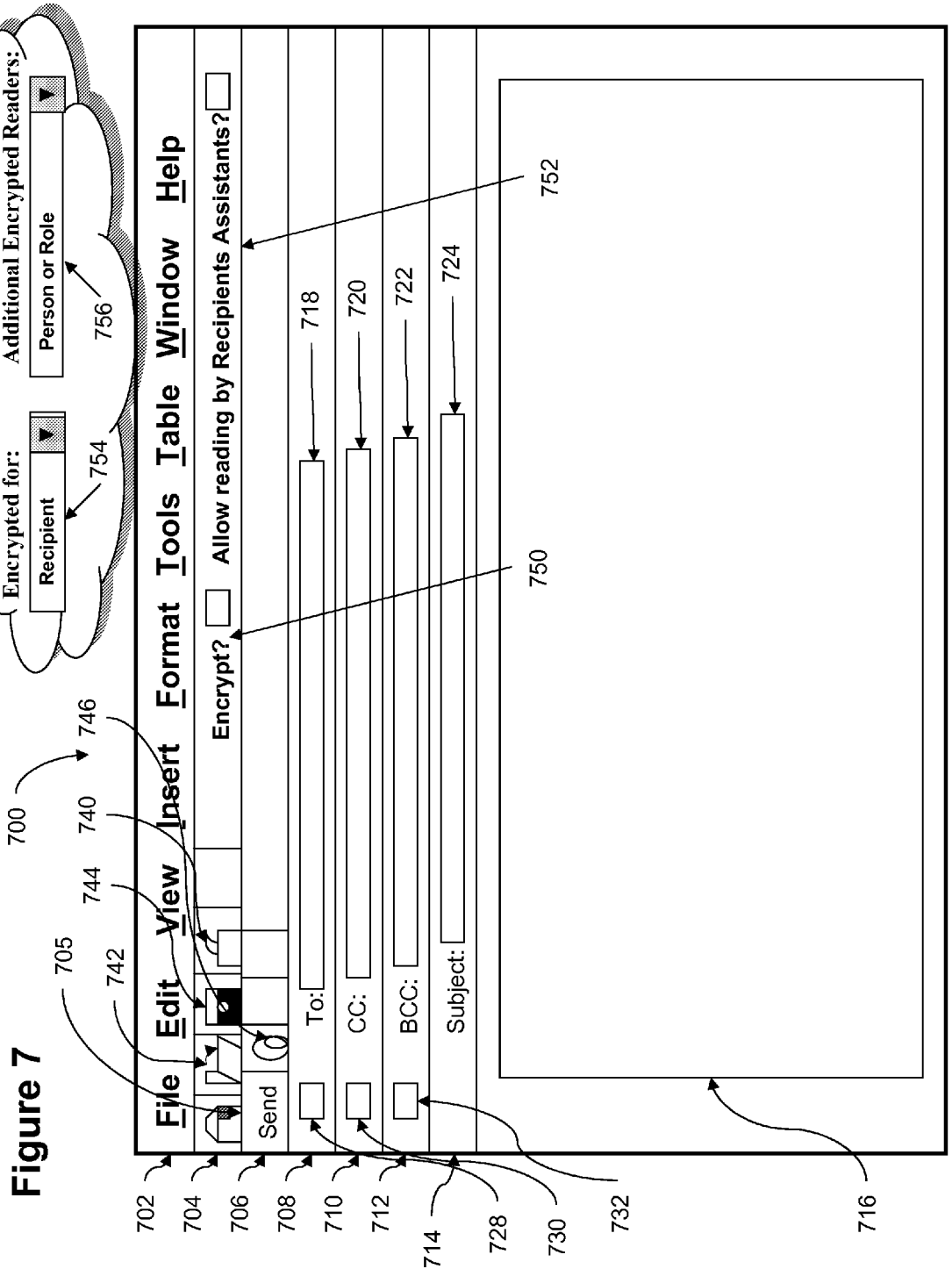
FIG. 7 is a pictorial diagram showing the user interface of an email message having the UI elements for making encrypted content available to derivable related parties.

UI (user interface) module 650 is the aggregate of means by which people (the users) interact with a particular machine, device, computer program or other complex tool (the system). The user interface provides means of input, allowing the users to manipulate the system, and output, allowing the system to produce the effects of the users' manipulation. An example of a UI for an email client is shown in FIG. 7.

UI 700 illustrates the familiar fields of a user interface. Command line 702 allows a user to select commands associated with the email client (in the present example) such as "File", "Edit", "View" etc. The command bar may be editable so that the user may customize which commands are available on the command bar. Each command, such as "File", may be a drop-down—allowing the user to select further options. The command selections are used by the application to take actions on the document which the user is working on.

Basic icon bar 704 has numerous icons which pictorially illustrate an action which a user may wish to select and take. For example, a user may wish to print the document being worked on. If the user selects the icon having the printer pictorial (740), the printer component is enabled and interacts with a printer driver and the document is printed. Other well known icons may be "Open Document" 742 or "File Save" 744.

Command line 706 is more specific to the application which the user is using. For instance, at the far left, is the "Send" command button 705 which would be specific to an email client such as the Lotus Notes or Microsoft Office Outlook email clients. Other command buttons are shown to the right of the Send button, such as a paper clip pictorial icon 746 which indicates an attachment to the email document.

Input fields 708, 710 and 712 receive intended specifically named recipient data from the sender/user/author. The specifically named recipients are those persons who the sender wishes to receive and have the ability to decrypt the content. The specifically named recipients could be direct recipients (in field 708), or carbon copied recipients (in field 710) or blind carbon copied recipients (in field 712).

Subject field 714 allows the user to identify the subject of the email. Content field 716 allows the user to input the information.

The "open book" icon 728, 730, 732 indicates a look up capability is available to the user. The open book icon, generally located directly to the left of the associated addressee field, as shown in FIG. 7, allows the user to select that capability.

It should be noted that the look up capability—that is the examination of the specific named addressee information, using that information to discover the email addresses of the specific named addressees, and auto-populating the addressee fields—is different than the associating capability of the present invention.

Also, new to this invention, check boxes 750 and 752. Checkbox 750 allows the sender to quickly choose to encrypt the email for all named recipients and checkbox 752 allows the sender to quickly choose to allow reading by each recipient's assistant. This user interface feature of the present invention allows an author to indicate whether to automatically add related parties to the explicitly listed names in the "encrypted for" list (in this case the named recipients) when encrypting data.

If the user interface indicates to include the additional parties, their names can be automatically obtained from canonical sources such as a LDAP lookup of the "assistant" field on the executive's/recipient's directory record. Their names can then be included in the "encrypted for" list resulting in the data being readable by the additional parties, typically by including the various assistants' public keys when encrypting the data.

This approach allows an author to have control over who can read the content, easily allowing reading by assistants and other related parties which is a common use case.

Drop-down boxes 754 and 756 allow the author to have more granular control over which recipients' assistants (or other role) are additional encrypted readers and their names are included in the "encrypted for" list. The setting could also be a sticky preference.

It should be noted that the recipient's assistant is the most typical scenario in today's business but certainly it could be another party, such as a manager, a peer, a person who assists the recipient but is not technically his/her assistant, and so forth. It also should be noted that this is being discussed in the context of email but the invention applies to other types of files as well, such as calendar invites, office productivity tool files (e.g., a Microsoft Excel spreadsheet) and others. In the case of the example of the office productivity tool files like a Microsoft Excel spreadsheet, these files do not necessarily need to be transmitted but can remain local to a machine as many times multiple users share the machine and the file can be encrypted on the single machine by listing the names of the people who can decrypt it and checking the "and their executive assistants" checkbox.

Figure 8:
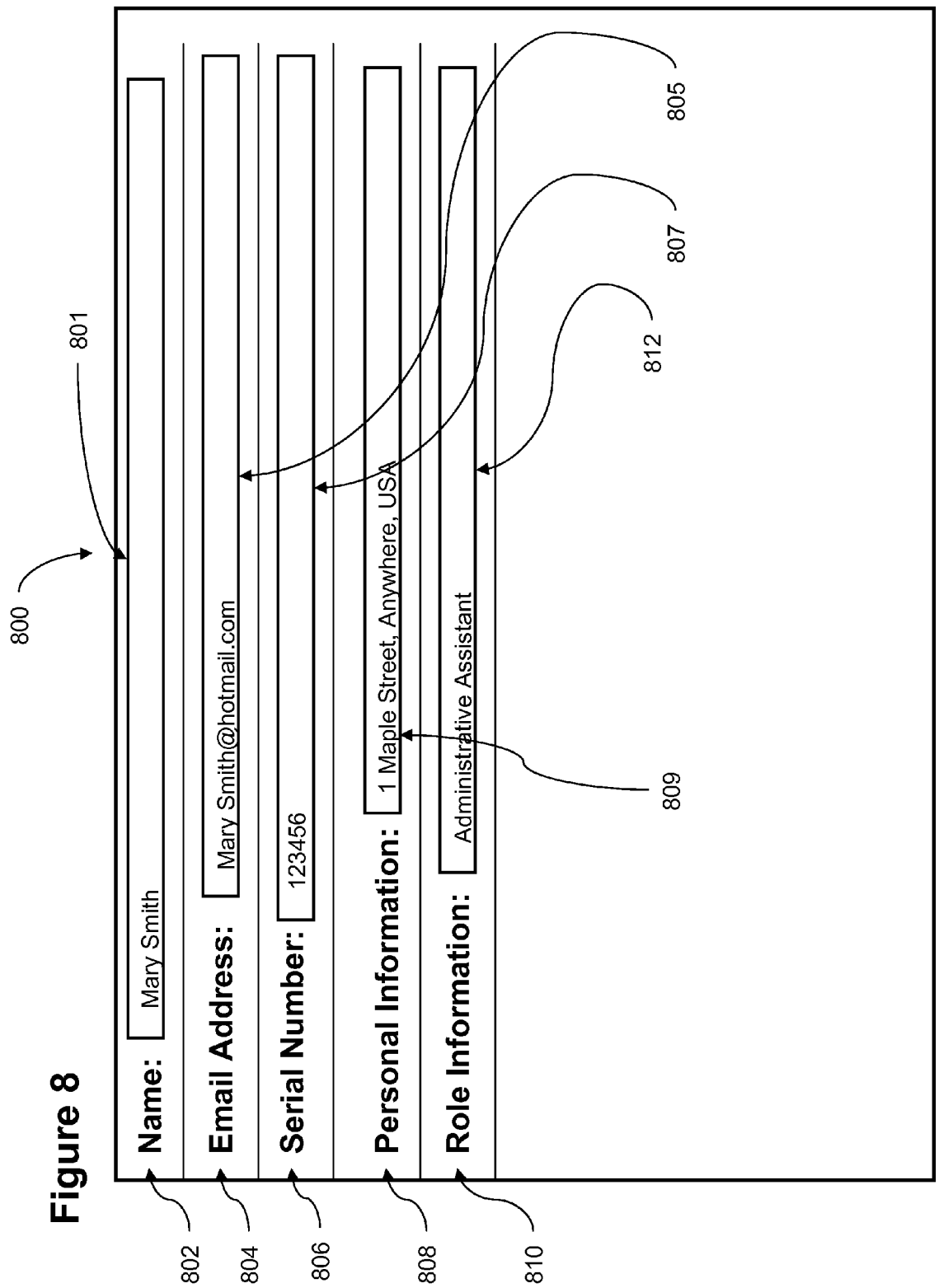
FIG. 8 is a pictorial diagram showing a example directory record.

FIG. 8 shows an example of a Directory Record 800. At 802, a "Name" field filled with a name such as "Mary Smith" at field 801 identifying the owner of the record. Email address 804 receives an email address in field 805 such as "Mary Smith hotmail.com". At 806, "Serial Number" could be filled with a serial number as "123456" at 807. At 808, there may be information associated with the user such as the user's address "1 Maple Street, Anywhere, USA" in 809. Field 810 identifies or associates the person with a role 810 based upon the Role Identification noted in field 812.

Figure 1:
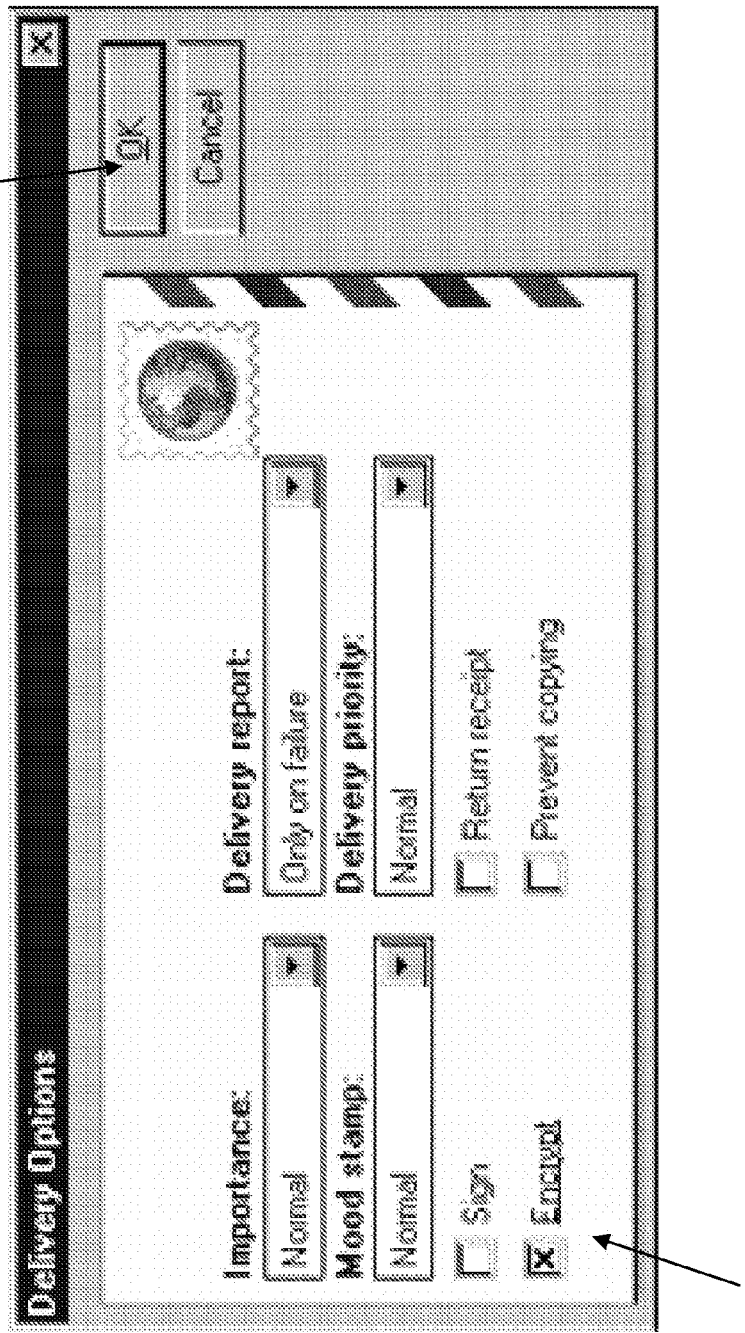
FIG. 1 is a pictorial diagram showing a prior art user interface challenge or pop-up for a user or author to elect to encrypt or not encrypt content prior to transmission.
Figure 2:
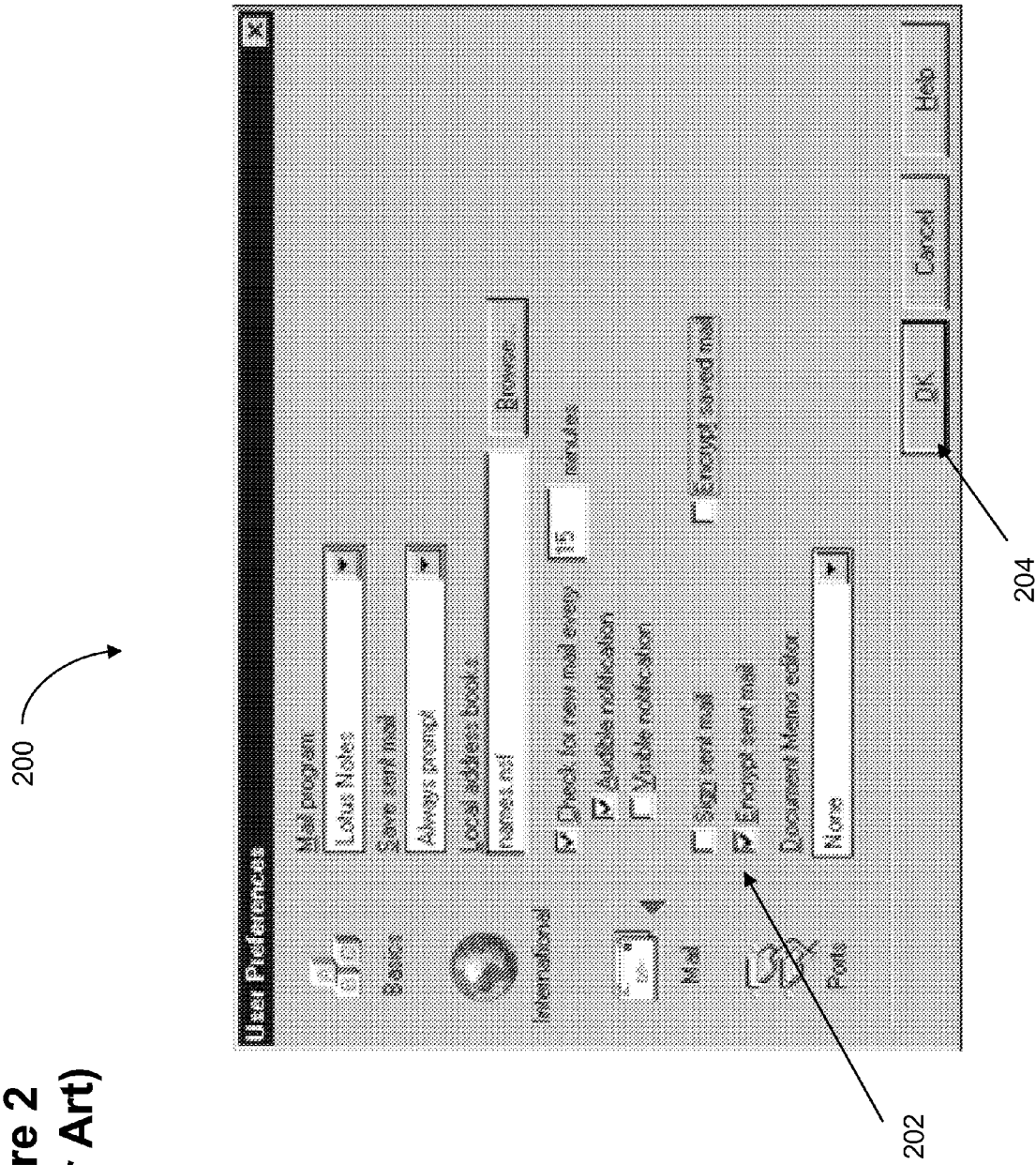
FIG. 2 is another pictorial diagram showing a prior art user interface challenge or pop-up for a user or author to elect to encrypt or not encrypt content prior to transmission.
Figure 4:
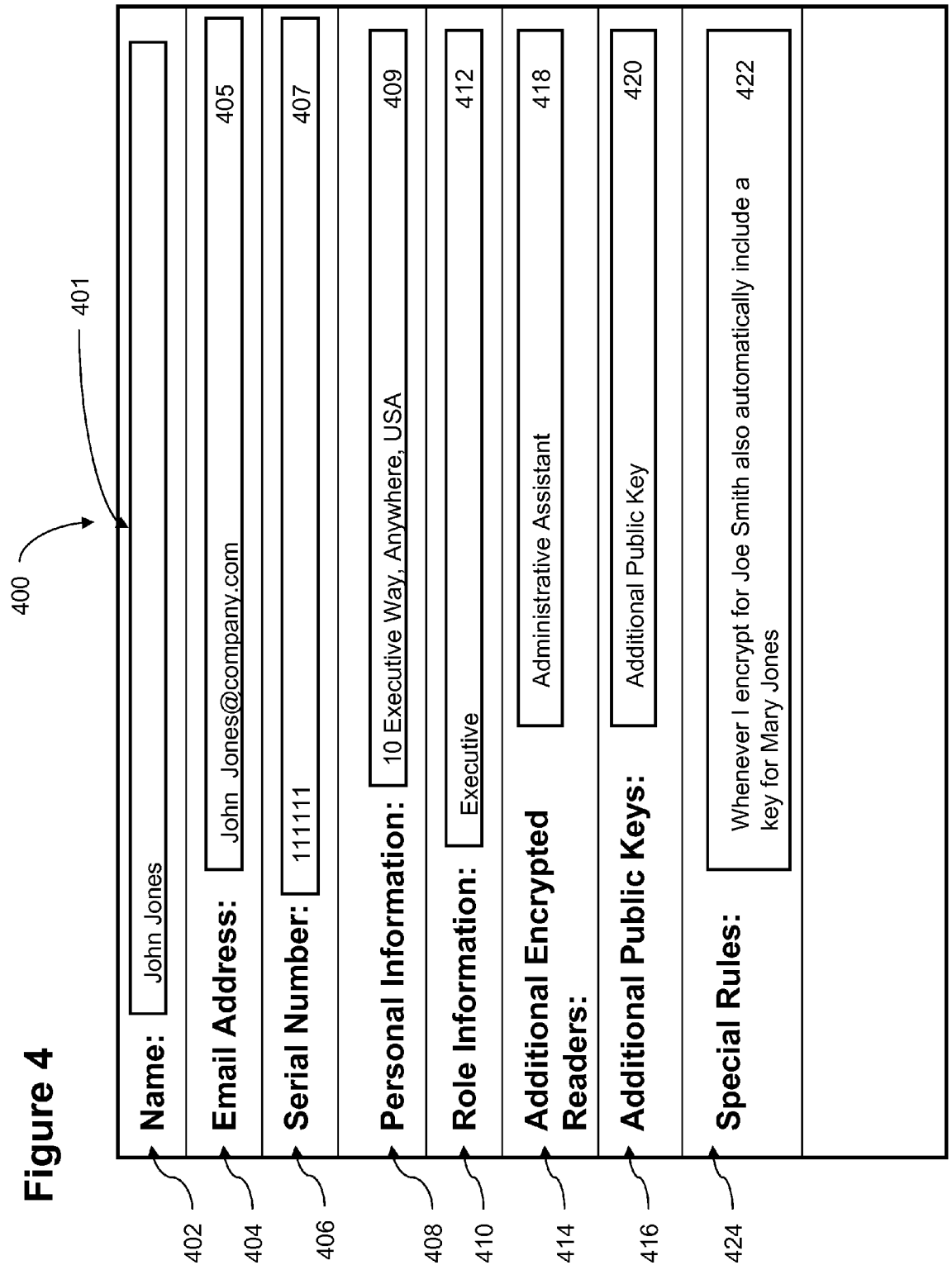
FIG. 4 is a pictorial diagram of an executive's directory record.

As shown in FIG. 4, an example of an executive's directory record 400 has similar fields as the directory record of FIG. 8, such as name 401/402, email address 404/405, serial number 406/407, address 408/409 and role information 410/412. In addition, it has three additional fields: additional encrypted readers 414/418, additional public keys 416/420, and special rules 424/422. These provide greater power and ease to the encryption process.

The additional encrypted readers field 414/418 lists additional encrypted readers to be added to the "encrypted for" list for any file which was encrypted for the executive—in this example—John Jones. In this case, it is the role "administrative assistant" as sometimes an executive will have turnover in the administrative assistant role or may have multiple administrative assistants. Anytime a file is encrypted for John Jones, the public keys of any and all of the administrative assistants listed as supporting him so that they may read the encrypted document. This was discussed to some degree above.

Another new concept is the use of additional public keys 416/420. The inclusion in the executive's directory record the additional public key to use (assuming public key encryption) when encrypting data for the executive rather than actual additional person names. With this mechanism, multiple assistants who all have access to the private key for the additional public key could each decrypt the data. The advantage of this mechanism is that it is easier to encrypt for a group of people (such as assistants) where the actual membership changes over time.

Finally, special rules field 424/422 allows the executive to have special rules associated files he has encrypted. In this example, if he encrypted a file for Joe Smith, a key is automatically included for Mary Jones.

Referring back to FIG. 6, look up module 620 is connected to both the local directory table 610 and the network directory table 680 so that the look up module may utilize the look up capabilities on either or both of the directory tables.

Deriving module 660 retrieves the addressee information from the email client 665 as input by the user in the addressee fields 708, 710 and 712. The deriving module 660 utilizes name parser 634 to parse the addressee fields 708, 710 and 712 and accesses the look up module 620 to identify the addressees as well as the associated parties or roles by reviewing such information from either the local name directory 610 or the network directory table 680. The deriving module 660, having received instructions from the user regarding roles associated with the named intended recipients and the authorized roles, derives the associated roles of that specific named recipient with assistance from role identification module 636 and authorization module 632.

Figure 9:
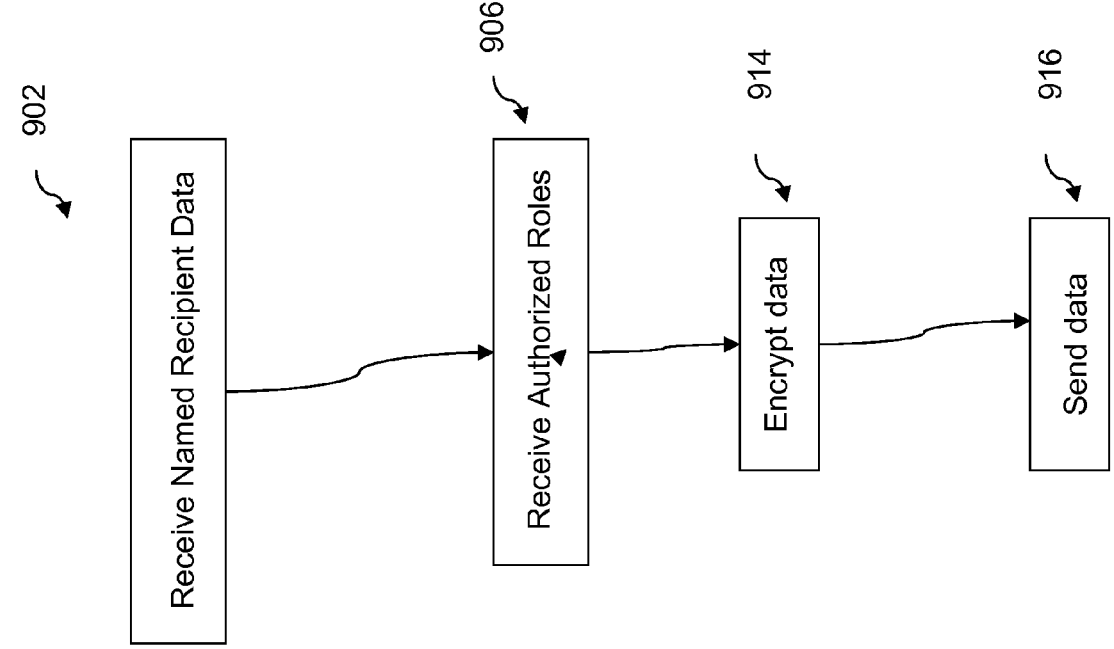
FIG. 9 shows a flowchart of a method of the present invention.
Figure 10:
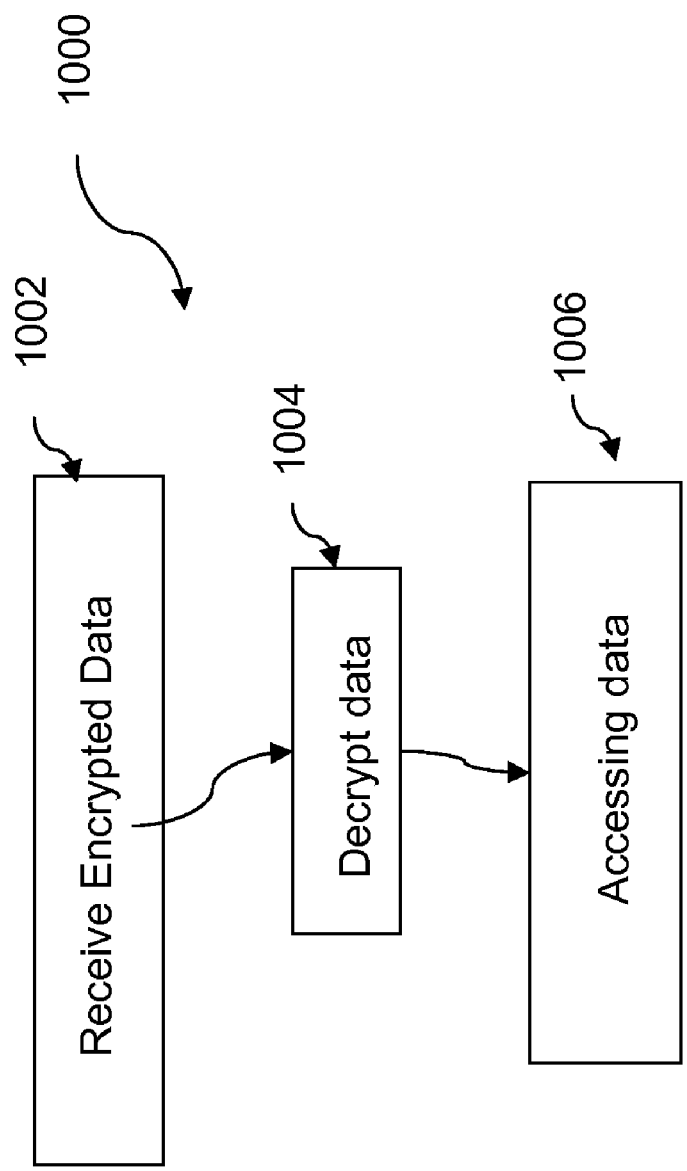
FIG. 10 shows a flowchart of another method of the present invention.

FIGS. 9 and 10 illustrate flowcharts 900 and 1000 showing steps of the method of the present invention. At 902, the present invention receives the named recipient identification data. At 906, the system receives the authorized roles. At 910, the system encrypts the data according to the received input and, at 912, the encrypted data is sent.

In FIG. 10, the intended recipient, or an authorized role, receives the encrypted data at 1002 in the process 1000. At 1004, the intended recipient, or authorized role, decrypts the data and at 1006 accesses the data.

Additionally, when sending an encrypted message that includes additional parties not in the recipient list (such as administrative assistants), the message could contain the names of the additional parties (either retrievable from the encrypted info/keys in some encryption schemes or explicitly added by means such as "X-header" extensions to the message) so that any "reply with history" could continue to be decryptable by the additional parties if the person creating the "reply with history" so desired.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for allowing an author to encrypt message data and to name one or more encrypted readers in a recipient list who are authorized to decrypt the message data, the system further allowing the author to select one or more roles related to the one or more named encrypted readers, the system comprising:

a user interface (UI) module that creates a user interface that is separate from a user interface for specifying recipients of message data of a particular message, and having:
one or more fields for receiving data corresponding to a named encrypted reader from the author to identify the named encrypted reader; and
one or more fields for receiving data to specify the authorized roles that are associated with a specific encrypted reader, each authorized role defining a relationship of an individual, who is associated with the encrypted reader, relative to the encrypted reader;
a directory table having information about the named encrypted readers and role information corresponding to the named encrypted readers;

a directory lookup module, connected to the directory table, for looking up the named encrypted readers and the role information corresponding to the named encrypted readers;

an associating module for:

retrieving, from the directory lookup module, role information corresponding to the named encrypted readers based on a presence of the encrypted reader as a recipient of the message data for the particular message;

associating the role information corresponding to the named encrypted readers with the authorized roles; and identifying other encrypted readers associated with the authorized roles, the other encrypted readers having access to the particular message solely based on being associated with one of the authorized roles;

an encryption component for encrypting the message data; and a decryption component for decrypting the encrypted message data and allowing the named encrypted readers and the other encrypted readers associated with the authorized roles to access the encrypted message data.

2. The system of claim 1 further comprising:

a name parser for parsing the names of the named encrypted readers and for verifying the names of the named encrypted readers; and an authorization module for authorizing the parsed names.

3. The system of claim 1 further comprising a role identification module for receiving roles having a level of authorization which are associated with the named encrypted readers.

4. The system of claim 1 further comprising an authorization module for authorizing the roles to access the encrypted content.

5. The system of claim 1 wherein the UI module further comprises a field to indicate whether the author wishes to encrypt the message data, wherein the one or more fields for receiving data to specify the authorized roles is set to a default value.

6. The system of claim 1 wherein the directory table is a local directory, and wherein the author has a personally created contact record having a special rules field having data associated with the author's named encrypted readers, the special rules identifying the other encrypted readers that are authorized to access the message data based upon one or more of the named encrypted readers.

7. The system of claim 1 wherein the encryption component for encrypting the data uses public key encryption and one or more of the named encrypted readers has an additional public key to use when the encryption component encrypts the message data.

8. The system of claim 1 wherein the system further comprises a conveying component for conveying the encrypted message data to the named encrypted readers and to the other encrypted readers associated with the authorized roles, the UI module having fields for receiving addresses of the named encrypted readers thereby creating a recipient list, wherein the directory table is remote from the author and is accessed using the conveying component.

9. The system of claim 8 wherein the message has additional parties not in the recipient list, and wherein the message has the names of the other encrypted readers associated with the authorized roles which are retrieved from encrypted info/keys or explicitly added by X-header extensions to the message.

10. A method for allowing a user to encrypt message data and to name one or more encrypted readers in a recipient list, the named encrypted readers having associated role data to identify roles associated with the named encrypted readers, the method comprising:

receiving, using a computing device, from the user, identification data corresponding to a named encrypted reader and role data identifying an authorized role that defines a relationship of an individual, who is associated with the encrypted reader, relative to the encrypted reader;

retrieving, using a computing device, role data associated with the authorized role from a directory table based upon the identification data corresponding to the named encrypted readers who are recipients of the message data for a particular message;

identifying, using a computing device, other encrypted readers based upon the associated role data retrieved from the directory table, the other encrypted readers having access to the particular message solely based on being associated with one of the authorized roles;

encrypting, using a computing device, the message data; and decrypting, using a computing device, the encrypted message data and allowing the named encrypted readers and the other encrypted readers to access the encrypted message data.

11. The method of claim 10 further comprising authorizing the identified other encrypted readers or role to access the encrypted message data.

12. The method of claim 11 further comprising accessing data according to the authorized role.

13. The method of claim 11 further comprising conveying the encrypted message data to each of the named encrypted readers and the other encrypted readers.

14. The method of claim 13 wherein the encrypted message data is an electronic communication such as email or calendar invitation.

15. The method of claim 10 further comprising parsing the identification data of the named encrypted readers and verifying the named encrypted readers.

16. A computer program comprising program code stored on a tangible computer-readable storage medium, which when executed by a computing system, performs a method for allowing a user to encrypt message data and to name one or more encrypted readers in a recipient list, the named encrypted readers having associated role data to identify roles associated with the named encrypted readers, the method comprising:

receiving, from the user, identification data corresponding to a named encrypted reader and role data identifying an authorized role that defines a relationship of an individual, who is associated with the encrypted reader, relative to the encrypted reader;

retrieving role data associated with the authorized role from a directory table based upon the identification data corresponding to the named encrypted readers who are recipients of the message data for a particular message;

identifying the other encrypted readers based upon the associated role data retrieved from the directory table, the other encrypted readers having access to the particular message solely based on being associated with one of the authorized roles;

encrypting the message data; and decrypting the encrypted message data and allowing the named encrypted readers and the other encrypted readers to access the encrypted message data.

17. The computer program of claim 16 further comprising authorizing the identified other encrypted readers or role to access the encrypted message data.

18. The computer program of claim 17 further comprising receiving a level of authority for each of the authorized roles.

19. The computer program of claim 16 further comprising accessing data according to the authorized role.

20. The computer program of claim 16 further comprising conveying the encrypted message data to each of the named encrypted readers and the other encrypted readers.

21. The computer program of claim 20 wherein the encrypted message data is an electronic communication such as email or calendar invitation.

22. The computer program of claim 16 further comprising parsing the identification data of the named encrypted readers and verifying the named encrypted readers.

* * * * *